US008456454B2

(12) United States Patent
Chen et al.

(10) Patent No.: US 8,456,454 B2
(45) Date of Patent: Jun. 4, 2013

(54) DISPLAY PANEL

(75) Inventors: Yung-Chih Chen, Hsin-Chu (TW); Chun-Hsin Liu, Hsin-Chu (TW); Tsung-Ting Tsai, Hsin-Chu (TW); Kuo-Chang Su, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 1017 days.

(21) Appl. No.: 12/488,946

(22) Filed: Jun. 22, 2009

(65) Prior Publication Data

US 2010/0171726 A1 Jul. 8, 2010

(30) Foreign Application Priority Data

Jan. 8, 2009 (TW) ............................... 98100530 A

(51) Int. Cl.
*G06F 3/038* (2006.01)
*G09G 5/00* (2006.01)
*G02F 1/1333* (2006.01)

(52) U.S. Cl.
USPC ................ 345/204; 345/211; 349/40; 349/54

(58) Field of Classification Search
USPC ......................... 345/206; 349/54; 324/760.01
See application file for complete search history.

(56) References Cited

U.S. PATENT DOCUMENTS 5,063,378 A * 11/1991 Roach ............................ 345/90
5,111,060 A * 5/1992 Asada ........................... 327/526
6,111,621 A * 8/2000 Kim et al. ....................... 349/54
6,639,634 B1 * 10/2003 Zhang et al. .................... 349/54
6,690,347 B2 * 2/2004 Jeon et al. ...................... 345/100
2006/0187722 A1 * 8/2006 Han et al. ....................... 365/200
2007/0085809 A1 * 4/2007 Wei et al. ....................... 345/100
2007/0109235 A1 * 5/2007 Hsu et al. ........................ 345/87
2007/0132700 A1 * 6/2007 Cho et al. ....................... 345/100
2007/0164972 A1 * 7/2007 Chang ........................... 345/100
2007/0216634 A1 9/2007 Kim et al.
2008/0043006 A1 * 2/2008 Wei et al. ....................... 345/205

FOREIGN PATENT DOCUMENTS

CN 1912966 2/2007
CN 100410744 C 8/2008

OTHER PUBLICATIONS

English translation of abstract and pertinent parts of CN 100410744 C.
English language translation of abstract of CN 1912966.

* cited by examiner

*Primary Examiner* — Bipin Shalwala
*Assistant Examiner* — Benyam Ketema
(74) *Attorney, Agent, or Firm* — McClure, Qualey & Rodack, LLP

(57) ABSTRACT

A display panel is disclosed, which includes a substrate, a shift register array, plural scan lines, a compensating circuit, a first repair line, and a second repair line. The shift register array having plural shift registers is disposed on a non-display area of the substrate. The scan lines connect to the shift registers respectively to drive plural display units. The first repair line and the second repair line are connected to the compensating circuit and bridged over two ends of each scan line in the non-display area, respectively.

20 Claims, 4 Drawing Sheets

DISPLAY PANEL

RELATED APPLICATIONS

This application claims priority to Taiwan Application Serial Number 98100530, filed Jan. 8, 2009, which is herein incorporated by reference.

BACKGROUND

1. Field of Invention

The present invention relates to a display panel. More particularly, the present invention relates to a repair method for the shift registers of the display panel.

2. Description of Related Art

Liquid crystal displays have many advantages, such as high definition, small volume, lightweight, low voltage drive, low consumption of power, a broad range of applications, etc. Therefore, liquid crystal displays are already broadly used in consumer electronic devices or computer products, such as portable televisions, cellular phones, camcorders, laptop computers, desktop displays, projection televisions, etc., thereby becoming the main stream for displays.

A shift register array consisting of plural shift registers can be formed on a glass substrate by membrane process when fabricating a display panel. The shift register array is formed on the glass substrate directly for driving, thus the conventional gate driver chips could be omitted to reduce the price of the display panel. However, if one of the shift registers disposed on the glass substrate failed to operate, the liquid crystal display panel cannot operate normally, which would generate extra cost and reduce yield.

SUMMARY

It is to be understood that both the foregoing general description and the following detailed description are by examples, and are intended to provide further explanation of the invention as claimed.

An embodiment of the present invention provides a display panel, which includes a substrate, a shift register array, plural scan lines, a compensating circuit, a first repair line, and a second repair line. The shift register array having plural shift registers is disposed on a non-display area of the substrate. The scan lines connect to the shift registers respectively to drive plural display units. The first repair line and the second repair line are connected to the compensating circuit and bridged over two ends of each scan line in the non-display area, respectively.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
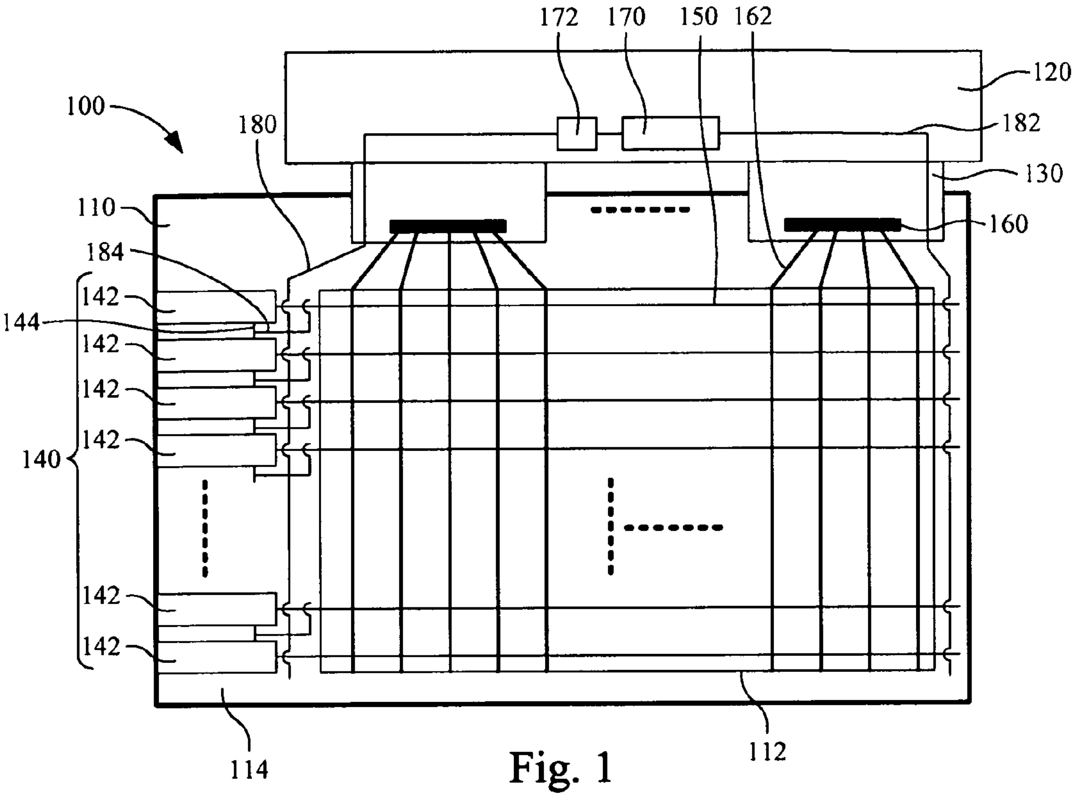
FIG. 1 illustrates a schematic diagram of a first embodiment of the display panel of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates a schematic diagram of a first embodiment of the display panel of the invention. The display panel 100 includes a substrate 110, a printed circuit board 120, a flexible printed circuit board 130 for connecting the substrate 110 and the printed circuit board 120, a data line driver 160 disposed on the flexible printed circuit board 130, a shift register array 140, plural scan lines 150, and plural data lines 162. The shift register array 140, the scan lines 150, and the data lines 162 are disposed on the substrate 110.

The substrate 110 is a glass substrate, which includes a display area 112 and a non-display area 114. The shift register array 140 is disposed on the non-display area 114. In this embodiment, the shift register array 140 consists of plural shift registers 142, and the shift registers 142 are disposed at a side of the substrate 110. The display area 112 includes plural display units (not shown). The data lines 162 are connected to the data line driver 160. The scan lines 150 are connected to the shift registers 142 of the shift register array 140 respectively. The scan lines 150 and the data lines 162 pass through the display units for driving.

The display panel 100 includes a spare shift register 170. The spare shift register 170 is disposed on the printed circuit board 120 in this embodiment. The display panel 100 includes a compensating circuit 172 connected to the spare shift register 170. The compensating circuit 172 is disposed on the printed circuit board 120 in this embodiment. The spare shift register 170 and the compensating circuit 172 can be disposed on the substrate 110 or the flexible printed circuit board 130 in another embodiment, The display panel 100 includes a first repair line 180 and a second repair line 182. The first repair line 180 is connected to the compensating circuit 172, and the second repair line 182 is connected to the spare shift register 170. Two ends of each scan lines 150 are disposed on the non-display area 114. The first repair line 180 bridges over an end of each scan line 150 respectively. The second repair line 182 bridges over another end of each scan line 150 respectively. The first repair line 180 is disposed near the shift register array 140. The second repair line 182 is disposed opposite to the shift register array 140.

The display panel 100 includes plural connected lines 144 for connected the shift registers 142. The display panel 100 includes plural spare lines 184. An end of each spare line 184 is connected to the each connected line 144, and another end of each spare line 184 is bridged over each scan line 150 arranged previous. Namely, there is one connected line 144 disposed between two adjacent shift registers 142 for connecting the shift registers 142, and the spare line 184 connected to the connected line 144 is bridged over the scan line 150, which is connected to the previous shift register 142 above the two shift registers 142 connected by the connected line 144. The spare lines 184 do not connect to the first repair line 180 in this embodiment.

Figure 2:
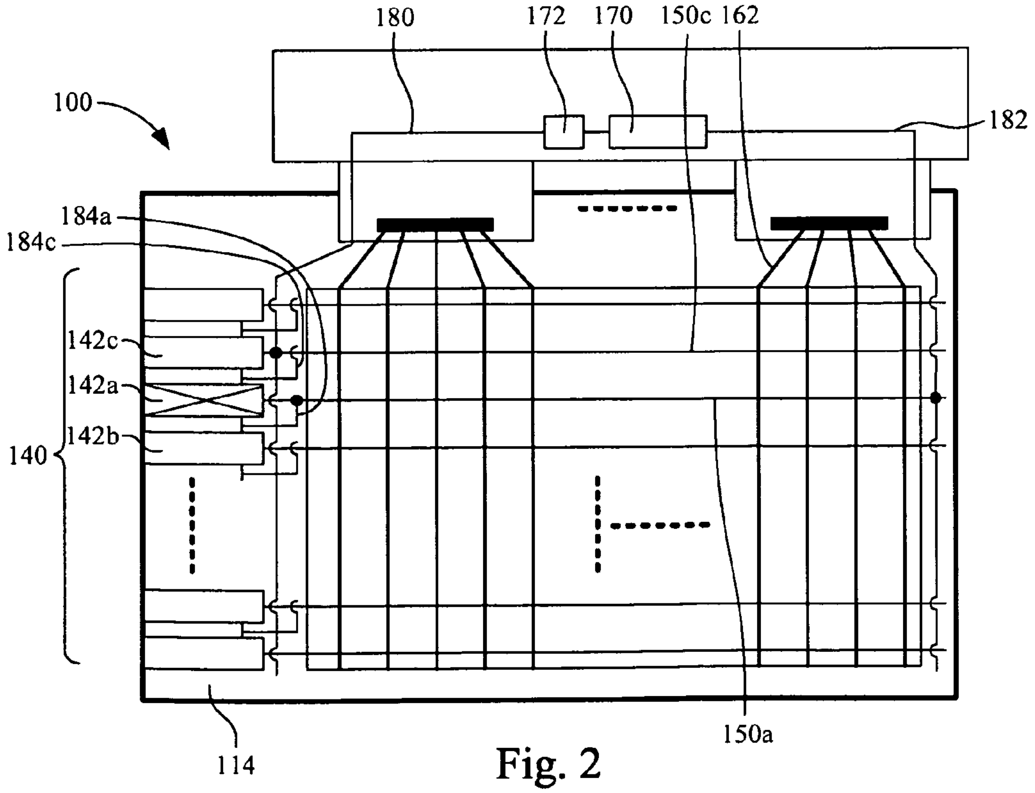
FIG. 2 illustrates a schematic diagram of a second embodiment of the display panel of the invention.

Refer to FIG. 2. FIG. 2 illustrates a schematic diagram of a second embodiment of the display panel of the invention. In this embodiment, one of the shift registers 142 is damaged and becomes the failure shift register 142*a*. The failure shift register 142*a* is failed to operate and the display function of the display panel 100 is limited. The present embodiment can use the spare shift register 170 to replace the function of failure shift register 142*a*, thus the display panel 100 can operate normally.

The scan line 150*a* is connected to the failure shift register 142*a*, wherein an end of the scan line 150*a* is soldered and connected to the second repair line 182, and another end of the scan line 150*a* is soldered and connected to the corresponding spare line 184*a*. Thus the next shift register 142*b* can be operated normally. The first repair line 180 is connected to the shift register 142*a*, which is arranged previous to the failure shift register 142*a*, wherein the first repair line 180 is soldered and connected to the scan line 150*c*, which is connected to the shift register 142*c* previous to the failure shift register 142*a* in this embodiment. In another embodiment, the first repair line 180 could be soldered and connected to the spare line 184*c*, which is arranged previous to the failure shift register 142*a*.

The current from the previous shift register 142*a* flowing to the scan line 150*c* is led to the spare shift register 170, and the current is further transmitted to the second repair line 182 and led to the scan line 150*a*, which is connected to the failure shift register 142*a*, thus the scan line 150*a* can be driven by the spare shift register 170. Then the current to drive the scan line 150*a* is further transmitted to the next shift register 142*b* via the spare line 184*a*, which is soldered and connected to the scan line 150*a*, thus the next shift register 142*b* and the followings can be operated normally.

The spare shift register 170 can replace the failure shift register 142*a* and drive the display units on the scan line 150*a* via the first repair line 180 and the second repair line 182. The compensating circuit 172 can modify the gate pulse output by the spare shift register 170. The compensating circuit 172 can be a trigger or an amplifier.

Figure 3:
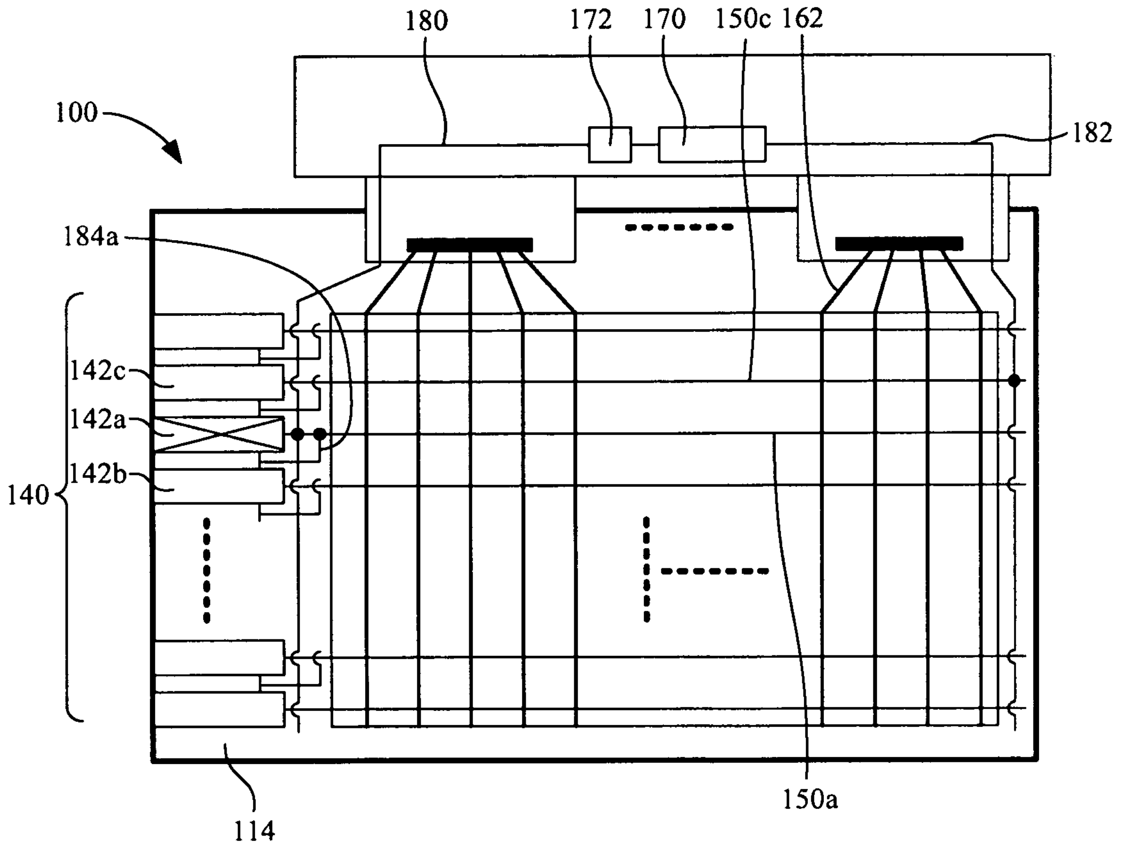
FIG. 3 illustrates a schematic diagram of a third embodiment of the display panel of the invention.

Refer to FIG. 3. FIG. 3 illustrates a schematic diagram of a third embodiment of the display panel of the invention. In this embodiment, the shift registers 142 are disposed on single side. The failure shift register 142*a* is damaged and failed to operate, thus the display panel 100 cannot be operated normally. The embodiment can use the spare shift register 170 to replace the function of the failure shift register 142*a*, and the display panel 100 can be operated normally.

The first repair line 180 is soldered and connected to the scan line 150*a*, which is connected to the failure shift register 142*a*. The spare line 184*a* disposed between the failure shift register 142*a* and the next shift register 142*a* is soldered and connected to the scan line 150*a*, which is connected to the failure shift register 142*a*. The second repair line 182 is soldered and connected to the scan line 150*c*, which is connected to the shift register 142*c* previous to the failure shift register 142*a*. The current direction in this embodiment can be different from the current direction in the second embodiment.

The current from the shift register 142*c* previous to the failure shift register 142*b* is led to the second repair line 182 via the scan line 150*c*. Then the current is transmitted to the spare shift register 170 via the second repair line 182, and the current is further transmitted to the first repair line 180. The scan line 150*a* connected to the failure shift register 142*a* is soldered and connected to the first repair line 180, thus the current from the first repair line 180 is transmitted to the scan line 150*a*, and the scan line 150*a* can be driven by the spare shift register 170. Then the current is further transmitted to the next shift register 142*b* via the spare line 184*a*, which connects the scan line 150*a* and the next shift register 142*b*, thus the next shift register 142*b* and the followings can be operated normally.

The connected rule of the first repair line 180, the second repair line 182, and the spare shift register 170 for replacing the function of the failure shift register 142*a* is not limited by the disclosed embodiment, other possible connected rules that utilize the layout of the display in the first embodiment for using the spare shift register 170 to replace the failure shift register 142*a* for driving the scan line 150*a* are also in the scope of the present invention.

Figure 4:
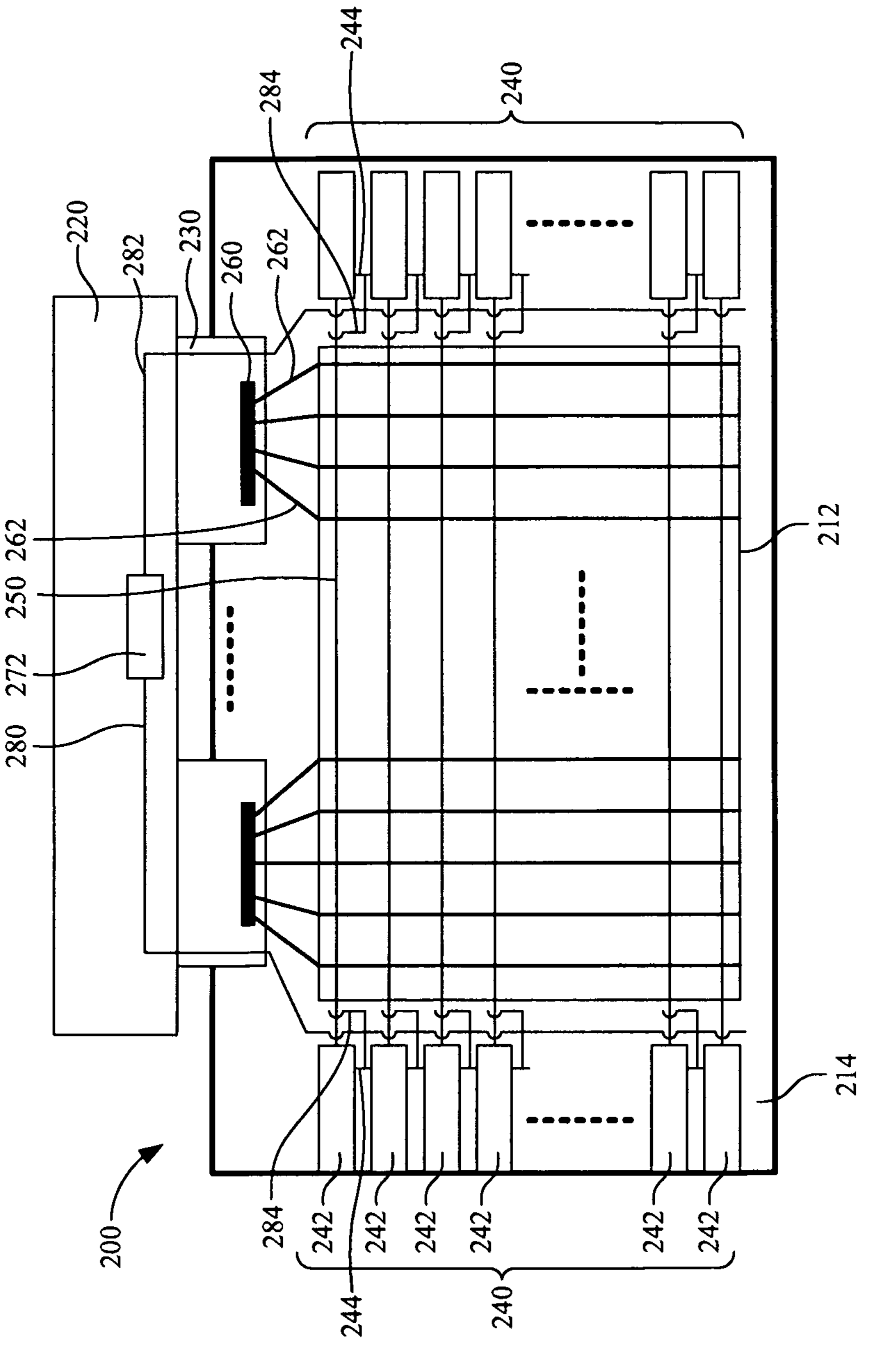
FIG. 4 illustrates a schematic diagram of a fourth embodiment of the display panel of the invention.

Refer to FIG. 4. FIG. 4 illustrates a schematic diagram of a fourth embodiment of the display panel of the invention. The display panel 200 is a dual side driven display panel. The shift registers 242 of the shift register array 240 are disposed on two opposite sides of the display area 212. Each scan line 250 is connected to two shift registers 242, which are disposed on opposite sides. The data line 262 is connected to the data line driver 260 disposed on the flexible printed circuit board 230. The scan lines 250 and the data lines 262 are utilized to drive the display units on the display area 212.

The display panel includes the compensating circuit 272. The compensating circuit 272 is disposed on the printed circuit board 220. The first repair line 280 and the second repair line 282 of the display panel 200 are connected to the opposite sides of the compensating circuit 272 respectively. Two ends of each scan lines 250 are disposed on the non-display area 214. The first repair line 280 bridges over an end of each scan line 250 respectively. The second repair line 282 bridges over another end of each scan line 250 respectively.

The shift registers 242 are connected by the connected lines 244. The display panel 200 includes plural spare lines 284. An end of each spare line 284 is connected to the each connected line 244, and another end of each spare line 284 is bridged over each scan line 250 arranged previous. Namely, there is one connected line 244 disposed between two adjacent shift registers 242 for connected the shift registers 242, and the spare line 284 connected to the connected line 244 is bridged over the scan line 250, which is connected to the previous shift register 242 above the two shift registers 242 connected by the connected line 244. The spare lines 284 do not connect to the first repair line 280 in this embodiment.

Figure 5:
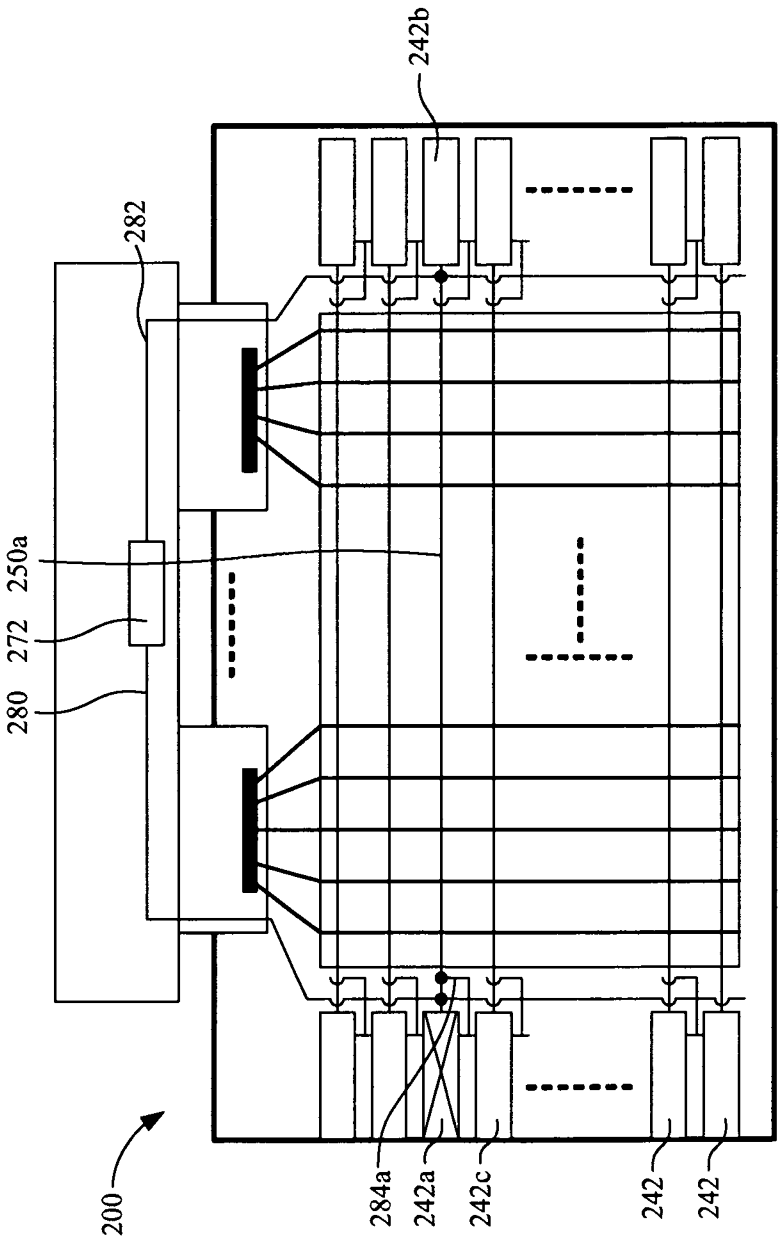
FIG. 5 illustrates a schematic diagram of a fifth embodiment of the display panel of the invention.

Refer to FIG. 5. FIG. 5 illustrates a schematic diagram of a fifth embodiment of the display panel of the invention. In this embodiment, one of the shift register 242*a* is damaged and becomes the failure shift register 242*a*. The first repair line 280 and the second repair line 282 are soldered and connected to two ends of the scan line 250*a*, which is connected to the failure shift register 242*a*. Thus the pairing shift register 242*b* at the opposite end of the scan line 250*a* can replace the function of the failure shift register 242*a*, and the display units on the scan line 250*a* can be dual side driven by the first repair line 280, the second repair line 282, and the pairing shift register 242*b* of the failure shift register 242*a*.

The compensating circuit 272 can modify the output gate pulse of the pairing shift register 242*b* of the failure shift register 242*a*, thus the brightness of the display units on the scan line 250*a* would not be reduced caused by the extra transmitting length of the first repair line 280. The scan line 250*a* connected to the failure shift register 242*a* is soldered and connected to the spare line 284, which is further connected to the next shift register 242*c*, thus the next shift register 242*c* and the followings can be operated normally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel comprising:

a substrate comprising a display area and a non-display area, wherein the display area comprises a plurality of display units;

a shift register array disposed on the non-display area and comprising a plurality of shift registers;

a plurality of connected lines disposed between the shift registers for connecting the shift registers;

a plurality of scan lines connected to the shift register respectively for driving the display units;

a plurality of spare lines, wherein an end of each spare line is connected to each of the connected lines respectively, and another end of each spare line is bridged over each of the scan lines arranged previous;

a compensating circuit;

a first repair line connected to the compensating circuit and bridging over an end of each scan line respectively; and a second repair line connected to the compensating circuit and bridging over another end of each scan line respectively, wherein two ends of the scan lines are located on the non-display area.

2. The display panel of claim 1, wherein when one of the shift registers becomes a failure shift register, the scan line connected to the failure shift register is soldered and connected to the corresponding spare line.

3. The display panel of claim 1, wherein the shift registers are disposed at two opposite sides of the substrate.

4. The display panel of claim 3, wherein when one of the shift registers becomes a failure shift register, the scan line connected to the failure shift register is soldered and connected to the second repair line.

5. The display panel of claim 4, wherein the scan line connected to the failure shift register is soldered and connected to the first repair line.

6. The display panel of claim 1, wherein the shift registers are disposed at a single side of the substrate; the first repair line is arranged near the shift registers, and the second repair line is arranged opposite to the shift registers.

7. The display panel of claim 6, wherein when one of the shift registers becomes a failure shift register, the scan line connected to the failure shift register is soldered and connected to the second repair line.

8. The display panel of claim 7, wherein the first repair line is soldered and connected to the shift register previous to the failure shift register.

9. The display panel of claim 6, wherein when one of the shift registers becomes a failure shift register, the scan line previous to the failure shift register is soldered and connected to the second repair line.

10. The display panel of claim 9, wherein the scan line connected to the failure shift register is soldered and connected to the first repair line.

11. The display panel of claim 6, further comprising a spare shift register disposed between the compensating circuit and the second repair line.

12. The display panel of claim 11, further comprising a printed circuit board, wherein the compensating circuit and the spare shift register are disposed on the printed circuit board.

13. The display panel of claim 1, wherein the compensating circuit comprises a trigger.

14. The display panel of claim 1, wherein the spare lines do not connect to the first repair line.

15. The display panel of claim 1, wherein the spare lines do not connect to the second repair line.

16. A display panel comprising:

a substrate comprising a display area and a non-display area, wherein the display area comprises a plurality of display units;

a shift register array disposed on the non-display area and comprising a plurality of shift registers;

a plurality of connected lines disposed between the shift registers for connecting the shift registers;

a plurality of scan lines connected to the shift register respectively for driving the display units;

a plurality of spare lines, wherein an end of each spare line is connected to each of the connected lines respectively, and another end of each spare line is bridged over each of the scan lines arranged previous;

a spare shift register;

a first repair line electrically connected to the spare shift register and bridging over an end of each scan line respectively; and a second repair line electrically connected to the spare shift register and bridging over another end of each scan line respectively, wherein two ends of the scan lines are located on the non-display area.

17. The display panel of claim 16, wherein when one of the shift registers becomes a failure shift register, the scan line connected to the failure shift register is soldered and connected to the corresponding spare line and the second repair line and the first repair line is soldered and connected to the shift register previous to the failure shift register.

18. The display panel of claim 17, wherein when one of the shift registers becomes a failure shift register, the shift register next to the failure shift register is receiving a gate pulse from the spare shift register and the spare shift register is receiving the gate pulse from the shift register previous to the failure shift register.

19. The display panel of claim 16, further comprising a compensating circuit disposed between the spare shift register and the first repair line.

20. The display panel of claim 16, wherein when one of the shift registers becomes a failure shift register, the scan line connected to the failure shift register is soldered and connected to the corresponding spare line and the first repair line, and the scan line connected to the shift register previous to the failure shift register is soldered and connected to the second repair line.

* * * * *